United States Patent [19]
Karch et al.

[11] 3,820,470
[45] June 28, 1974

[54] GUIDANCE MEANS FOR MAGNETICALLY SUSPENDED RAILWAY VEHICLES

[75] Inventors: Ludwig Karch; Siegfried Nowack, both of Munich, Germany

[73] Assignee: Messerschmitt-Bolkow-Blohm Gesellschaft mit beschrankter Haftung, Ottobrunn near Munich, Germany

[22] Filed: Dec. 8, 1971

[21] Appl. No.: 206,091

[30] Foreign Application Priority Data
Dec. 11, 1970   Germany.......................... 2060970

[52] U.S. Cl. ........................... 104/148 MS, 308/10
[51] Int. Cl............................................. B61b 13/08
[58] Field of Search ............. 104/148 MS, 148 LM; 308/10; 324/34 D, 34 PS

[56] References Cited
UNITED STATES PATENTS
| | | | |
|---|---|---|---|
| 2,822,694 | 2/1958 | McKenney | 308/10 |
| 2,856,238 | 10/1958 | Dacus | 308/10 |
| 3,125,964 | 3/1964 | Silverman | 104/148 MS |
| 3,611,944 | 10/1971 | Reder | 104/148 MS |
| 3,638,093 | 1/1972 | Ross | 104/148 MS |

FOREIGN PATENTS OR APPLICATIONS
| | | | |
|---|---|---|---|
| 707,032 | 6/1941 | Germany | 104/148 MS |

*Primary Examiner*—M. Henson Wood, Jr.
*Assistant Examiner*—George H. Libman
*Attorney, Agent, or Firm*—Toren and McGeady

[57] ABSTRACT

In the disclosed magnetic suspension railway system, a vehicle's adjustably excitable guide magnets define air gaps with parts of a track arrangement. The air gaps are associated in pairs along the length of the vehicle. The excitation of the guide magnets is adjusted in dependence upon variation of the ratio of the arithmetic mean of the gap widths in each pair of air gaps to the effective value of said gap widths. In one embodiment the vehicle is driven by a linear motor. The excitation of the guide magnets is adjustable in dependence upon variations of the motor air gaps.

19 Claims, 3 Drawing Figures

PATENTED JUN 28 1974  3,820,470

3,820,470

GUIDANCE MEANS FOR MAGNETICALLY SUSPENDED RAILWAY VEHICLES

BACKGROUND OF THE INVENTION

This invention relates to magnetically suspended rail vehicles, and particularly to means for controlling such vehicles.

Vehicles, which electromagnets suspend relative to a track arrangement, usually require lateral guides to prevent the stable equilibrium position from being upset by wind forces or centrifugal forces, or the like.

The above is particularly true for railway vehicles which are maintained in a suspended position by magnetic attraction. Preferably, additional guide magnets effect contact-free guidance of these vehicles in the lateral direction. These guide means form at least two vertical air gaps together with one or several guide rails which act as armatures.

Such magnetic suspension guidance would be perfect if the course of the guide rails were ideally accurate. However, in an arrangement with two guide rails, the interval between the rails unavoidably varies within a given tolerance range. In order to avoid disturbing the silence of the vehicle, a so-called air gap control is necessary. With such control the guide magnets of each vehicle are excited so as to maintain a constant air gap width equal to a given normal gap width relative to the corresponding guide rails. However, such magnetic guidance does not achieve complete quietude because the same nominal gap widths can be maintained in both gaps only if changes of the guide rails do not lead to a variation of the sum of the nominal gap widths. As soon as the sum of the nominal gap widths exceeds the sum of the actual gap widths, the vehicles swing unguided through a central range corresponding to the differences of these sums. If the sum of the nominal gap widths is less than the sum of the actual gap widths, such swinging can be avoided. However, this involves considerable expenditure of electrical power. This is so because the guide magnets of both vehicles are then excited simultaneously and operate against each other. An object of this invention is to improve guidance of magnetically suspended vehicles.

Another object of this invention is to eliminate the disadvantages. Another object of this invention is to achieve such magnetic guidance without play and without excessive use of power.

SUMMARY OF THE INVENTION

According to a feature of the invention, these objects are obtained and the disadvantages of prior systems overcome, by adjusting the excitation of guide magnets that serve to guide vehicles magnetically suspended on a rail track, in dependence upon a variation of the ratio of the arithmetic mean of one pair of vertical air gaps each to the effective value of said gaps defined by the guide magnets and associated with each other in pairs. The mean values are thus calculated from the air gap widths of one and the other lateral side of the vehicle associated with each other in pairs.

With such magnetic guidance, the guide magnets are thus not excited to maintain the nominal gap widths of the air gaps if this width should change. Rather the guide magnets operate so that all air gap widths together maintain an average gap width. Thus the vehicle can almost follow an ideal course.

According to another feature of the invention, if magnetic attractive forces are used for guidance, a desirable effect is achieved by exciting those guide magnets where the air gap widths are greater than that of the opposite guide magnets.

With equal gap widths, no guide magnet need be excited, unless air forces or the like indicate the need for unilateral action. In view of this fact, and according to another feature of the invention, additional excitation of the guide magnets is provided.

According to another feature of the invention, this magnetic guidance is used for air cushioned vehicles or for other rimless wheel vehicles. Thus, this type of magnetic guidance is not limited to vehicles that are magnetically suspended.

According to another feature of the invention, such magnetic guidance is used for railway vehicles driven by a linear motor, where guide magnets with adjustable excitation define vertical air gaps, associated in pairs, with parts of the track arrangement. Here the excitation of the guide magnets is adjustable in dependence upon a variation of the motor air gaps. With vertical motor air gaps, the excitation of the guide magnet is adjusted in dependence upon the variation of the arithmetic mean of the motor air gap widths associated in pairs. This prevents position changes of the guide rails from influencing the motor air gaps.

These and other features of the invention are pointed out in the claims. Other objects and the advantages of the invention will become known from the following detailed description when read in light of the accompanying drawings.

DESCRIPTION OF PREFERRED EMBODIMENTS

Figure 1:
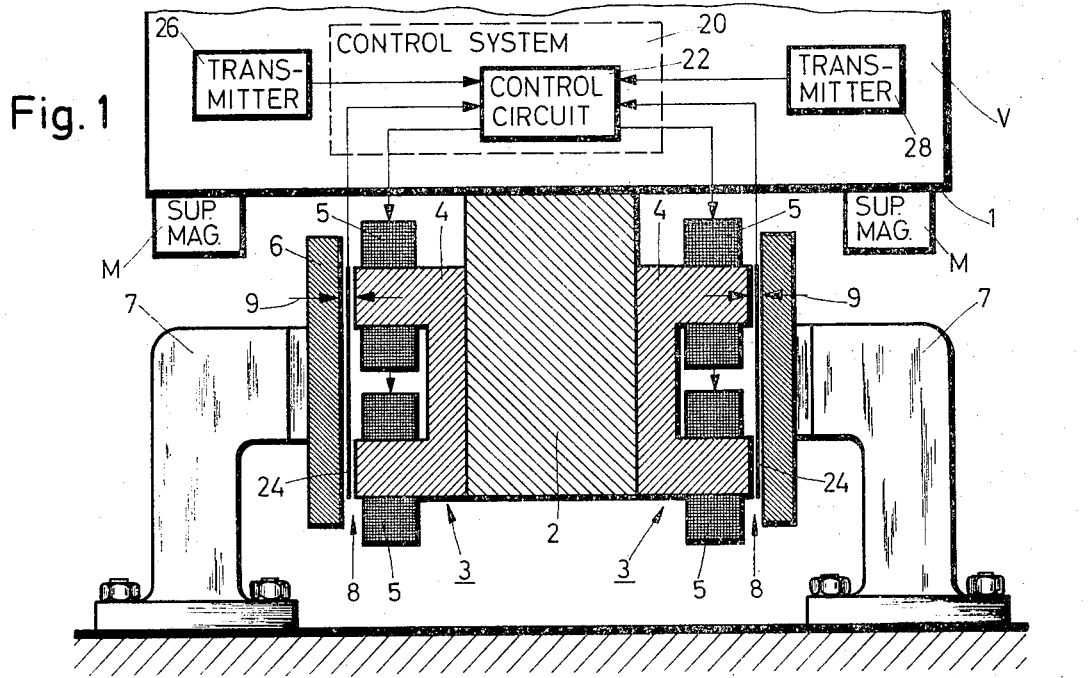
FIG. 1 is a partly schematic sectional view of a system, including a vehicle with guide magnets as well as the corresponding track arrangement, embodying features of the invention.

In FIG. 1 a schematically illustrated vehicle V has a bottom 1 an moves into and out of the face of the drawings over rails that also extend into and out of the drawings. The vehicle is suspended by supporting magnets shown schematically as M. A central supporting body 2 for guide megnets 3, extending parallel to the longitudinal axis of the vehicle, is secured to the vehicle bottom 1. The guide magnets 3 each include a U-shaped iron core 4 and two electric coils arranged on the arms of each U-shaped iron core. The magnets 3 are arranged in two rows extending over the entire length of the vehicle at both sides of the supporting body. Each magnet row is directed toward a stationary rail 6 which serves as an armature for the guide magnets 3. The rails 6, held by the rail supports 7, define narrow vertical air gaps 8 with the corresponding guide magnets 3.

The two gaps 8 shown have the same gap widths. The supporting body 2 and thus the vehicle are therefore located in a center position between the rails 6. As a rule the path or course of the rails, their interval and their position relative to each other will vary. Thus, the given gap width 9 cannot be maintained as the vehicle proceeds along the track. The air gaps 8 can also exhibit different gap widths over the length of the vehicle.

The guide magnets 3 are excited so that the air gaps maintain an average respective width. This keeps the vehicle in a center position, on the average, with respect to the rails 6. A control system 20 coacting with the magnets 3 furnished this effect by ascertaining an arithmetic mean to the control circuit 22 which measures parameters of the respective air gaps. The measured parameters which result from the gap width of the respective air gaps, are fed to the control circuit by electric gap feelers 24 in any one of known ways. The mean value, compared with the effective value of the gap widths, determines the excitation of the coils 5 and hence the guide magnets 3.

Preferably, those guide magnets are excited in which the effective value of the respective air gap widths is greater than that of the opposite guide magnets. Consequently, only the magnets of one lateral side of the vehicle need be excited to keep the vehicle in a center position with respect to the rails 6. With equal gap widths, no guide magnet need be excited.

Several such control circuits are distributed over vehicles of greater length so that the vehicles, or individual parts thereof, are not only displaced laterally because of the excitation of the guide magnets, but also rotatable about their vertical axes.

Beyond that, the excitation of the magnets is also adjusted in dependence on other measured parameters which can be determined from external forces, such as air blasts, etc. Thus, for example, known acceleration transmitters 26 and and pressure transmitters 28, which are part of the abovementioned vehicle, generate additional excitation currents for the guide magnets. As a rule, only the guide magnets arranged on the side on which the forces are applied need be excited or additionally excited. The excitation or additional excitation is in an amount sufficient to maintain the vehicle, acceleration free, in the center position. Thus, the vehicle can be continuously held in a center position and guided to follow an almost ideal path. The excitation of the guide magnets may also be regulated in dependence only on the mean value of the air gap widths located solely on one or the other lateral side of the vehicle. This permits control towards a desired direction, for example, in the proximity of a switch. It involves briefly exciting a row of guide magnets to maintain a given mean value. Naturally, the quantities measuring the parameters of the air gap are fed, in this case, to the control circuit by the gap feelers of the air gaps of only one side of the vehicle.

Figure 2:
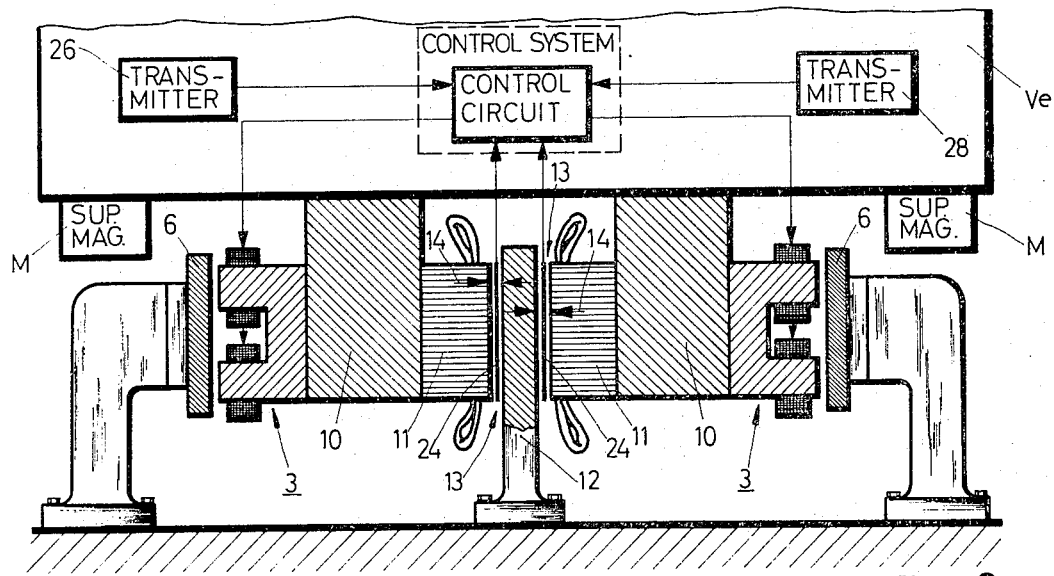
FIG. 2 is another partly schematic sectional view illustrating another system embodying features of the invention wherein a linear motor drives the vehicle on which the guided magnets coacting with track arrangement are mounted.

FIG. 2 shows an arrangement wherein magnetic guidance for a vehicle Ve which is held in suspension and is driven by a linear motor. In contrast to the arrangement in FIG. 1, the guide magnets are here distributed over two supporting bodies 10, each of which carries a unit of length 11 of the moving part of the linear motor. The stationary part 12 of the linear motor extends between these parallel units of length 11. Two narrow vertical motor gaps 13 of equal gap width 14 are formed.

In the arrangement of FIG. 2, the vehicle is held in the center position between the rails 6 substantially in the same manner as described before. In view of the changes in the positions of the rails 6, the excitation of the guide magnets is adjustable in dependence upon variation of the arithmetic mean of the pairs of associated motor air gap widths 14. These mean values are calculated from the air gap widths of one and the other motor side. The guide magnets are thus excited in dependence upon a variation of the motor air gaps 13. The quantities being measured are fed to the abovementioned control circuit by gap feelers only in the air gaps 13. Such magnetic guidance has the advantage that position changes of the rails have no effect on the motor air gaps 13.

It should be noted that excitation of the guide magnets in dependence upon a variation of one or several motor air gaps is not the only way of accomplishing the desired end. Rather, if a linear motor with a horizontal air gap is used, the guide magnets can also be excited in dependence upon a relative lateral displacement of the moving motor part with respect to the stationary part. Any other determinable position change from the moving motor part with respect to the stationary part may also be used as a measure of the variation of the motor air gap.

Figure 3:
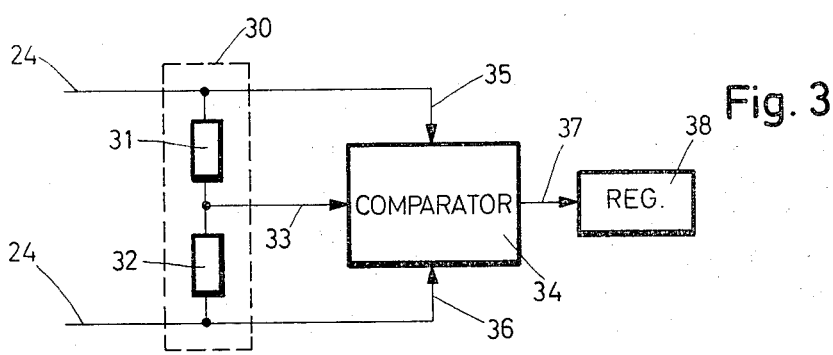
FIG. 3 is a block diagram illustrating details of the control systems of FIGS. 1 and 2.

The control system in FIG. 2 corresponds substantially to the control system in FIG. 1. According to one embodiment of the invention, the control circuits of FIGS. 1 and 2 each include an adding circuit 30 that responds to the electrical output from each of the pairs of sensors 24 (of the magnets on the vehicle). In this adding circuit according to FIG. 3 two output voltages from the sensors 24 are added, for example, by means of the resistors 31 and 32 and halved by a midconnection 33, thus forming the arithmetic mean of a pair of gap widths. A comparator 34 then compares the arithmetic mean with the voltages furnished by the sensors 24 to the former at 35 and 36. The signal resulting from this comparison is supplied from the output 37 of the comparator 34 to the regulator 38 of the control circuit. In the control circuit the decision is then made by the regulator 38 as to which magnet is to be excited to hold the vehicle in the center position between the rails 6.

According to another embodiment of the invention, the regulator 38 (FIG. 3) also includes such means (usual electronic arithmetic circuits) which permit keeping a gap constant on one or the other lateral side of the vehicle. For this purpose the regulator 38 processes only signals from the outputs of the sensors of one or the other side of the vehicle whereby, for example, these signals are compared with a reference voltage produced in the regulator as a nominal value. The regulator 38 then excites the magnets 3 in such a way that the vehicle follows either the right or the left rail, the constant air gap of the relevant magnets being maintained.

In the above it should be noted that only the outputs of the sensors forming one set in a row of pairs of sensors are added and compared, or compared and added. Where several rows of guide magnets are used so that the vehicle can be rotated about a vertical axis, the comparison and addition are performed separately.

What is claimed is:

1. A guidance system for a vehicle adapted to move along a track, comprising moving means arranged to move the vehicle relative to the track, said moving means being positioned so as to form a plurality of pairs of air gaps with a portion of the track so that the air gaps vary in width as the vehicle moves laterally relative to the track, said moving means including a plurality of pairs of guide magnets, said pairs of guide magnets being positioned in alignment with the track and the vehicle, said guide magnets in each pair being positioned so as to be located on one and the other lateral side of the portion of the track, control means coupled to said guide magnets for exciting the guide magnets so as to shift the vehicle position laterally in dependence on the variation of the ratio of the arithmetic mean of the gap widths in each pair to the gap widths formed by said moving means.

2. A system as in claim 1, wherein said control means includes sensing means for sensing the gap widths in each pair formed on one or the other lateral side of the vehicle when said vehicle moves along the track.

3. A system as in claim 1, wherein said pairs of guide magnets form the pairs of gaps.

4. A system as in claim 1, wherein said moving means includes drive means forming a linear motor with the portion of the track, and wherein said drive means form the pairs of gaps as part of the motor when said vehicle moves along the track.

5. A system as in claim 4, wherein said guide means are positioned so that the air gaps are formed vertically, said control means including sensing means for sensing the gaps in each pair formed on one and the other lateral side of the vehicle and adjusting means responsive to said sensing means for adjusting the guide magnets in each pair in dependence on the variation of the arithmetic mean of the pairs of air gap widths.

6. A system as in claim 3, wherein said control means includes sensor means for sensing the gaps formed by all of said guide magnets and calculating means for exciting those guide magnets where the one of the air gap widths is greater than that of the opposite gap in each pair formed by the guide magnets when the vehicle is on the track.

7. A system as in claim 4, wherein said moving means includes drive means forming a linear motor with the portion of the track, and wherein said drive means form the pairs of gaps as part of the motor when said vehicle moves along the track.

8. A system as in claim 2, wherein pairs of said guide magnets form said pairs of gaps.

9. A system as in claim 1, wherein said control means further comprises means for furnishing additional excitation to said guide magnets.

10. A system as in claim 1, wherein said control means includes transmitter means responsive to external forces operating on the vehicle for adjusting the excitation of said guide means in response thereto.

11. A system as in claim 10, wherein said control means includes sensing means for sensing the gap widths in each pair formed on one or the other lateral side of the vehicle when said vehicle moves along the track.

12. A railway system, comprising a track, a vehicle movable along said track, moving means on said vehicle arranged to move the vehicle relative to the track, said moving means being positioned on the vehicle so as to form a plurality of air gaps with a portion of the track so that the air gaps vary in width as the vehicle moves laterally relative to the track, said moving means including a plurality of pairs of guide magnets, said pairs of guide magnets being positioned in alignment with the track, said guide magnets in each pair being positioned on one and the other lateral side of the portion of the track, control means coupled to said guide magnets for exciting the guide magnets so as to shift the vehicle position laterally in dependence on the variation of the ratio of the arithmetic mean of the gap widths in each pair to the gap width formed by said moving means.

13. A system as in claim 12, wherein said control means include sensing means for sensing the gap widths in each pair formed on one or the other lateral side of the vehicle.

14. A system as in claim 1, wherein said control means includes a plurality of sensors, each projecting into at least one of the gaps on one or the other lateral side of the vehicle when the vehicle moves along the track and a control arrangement for exciting the guide magnets.

15. A system as in claim 1, wherein said control means includes a pair of sensors projecting into different ones of the two gaps formed on the lateral side of the vehicle when the vehicle moves along the track and a control arrangement for exciting the guide magnets.

16. A system as in claim 1, wherein said control means includes a plurality of pairs of sensors, each pair of sensors projecting into respective ones of the pairs of air gaps, said control means including a control arrangement for exciting the guide magnets.

17. A system as in claim 1, wherein said control means includes means for exciting the guide magnets in dependence only on the mean value of the air gap widths located on one or the other lateral side of the vehicle.

18. A system as in claim 17, wherein said means in said control means for exciting the guide magnets in dependence only on the mean value of the air gap widths located on one side of the vehicle being temporarily operable in the proximity of a switch when the vehicle moves past a switch.

19. A system as in claim 18, wherein said control means includes a plurality of pairs of sensors, each pair of sensors projecting into respective ones of the pairs of air gaps, said control means including a control arrangement for exciting the guide magnets.

* * * * *